2,708,517
Patented May 17, 1955

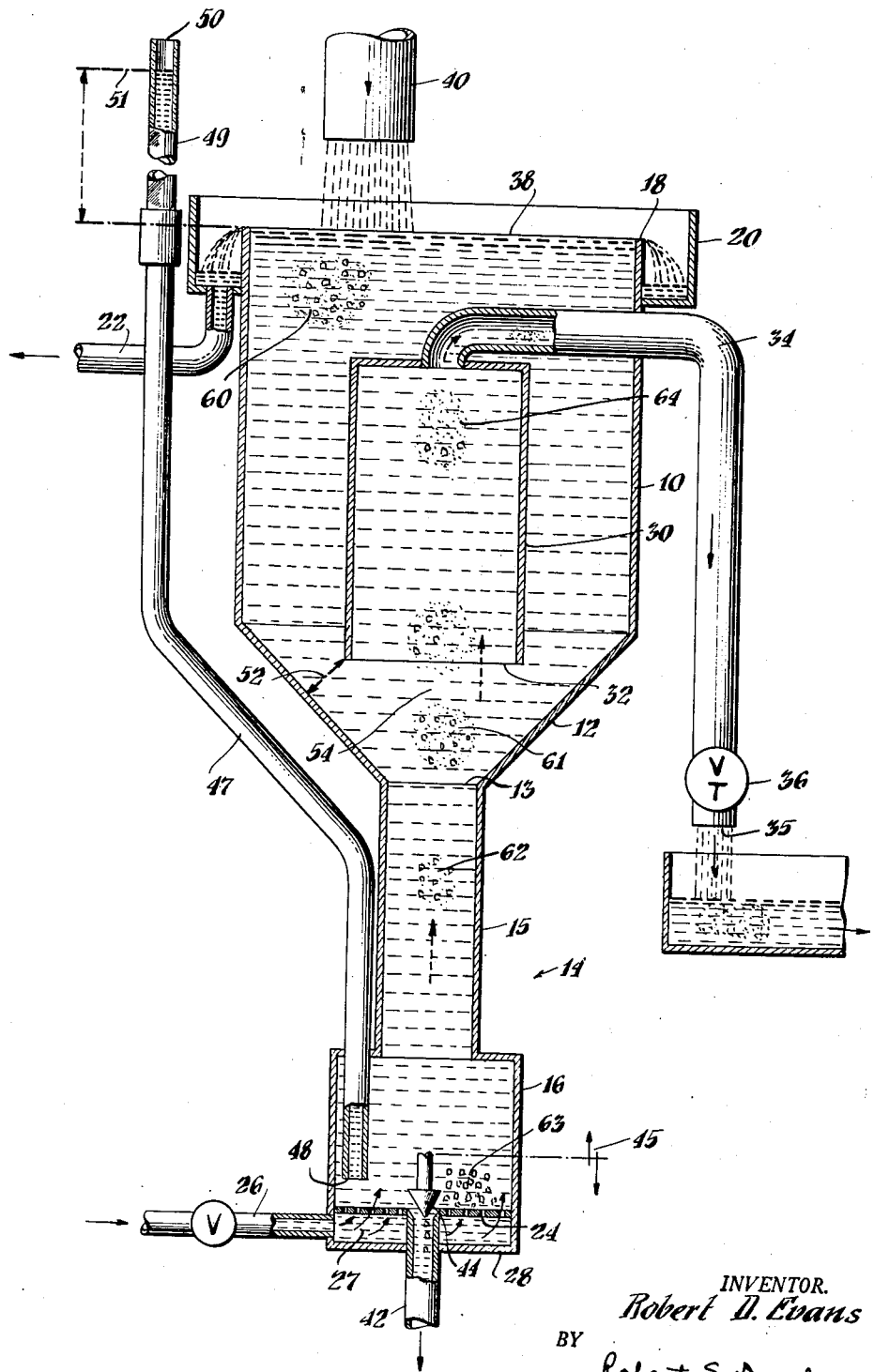

2,708,517
HYDRAULIC CLASSIFICATION OF SOLIDS

Robert D. Evans, Pierce, Fla., assignor to The American Agricultural Chemical Company, New York, N. Y., a corporation of Delaware Application July 30, 1949, Serial No. 107,727

10 Claims. (Cl. 209—158)

This invention relates to hydraulic sizing or classification of solids, particularly solid material in divided form, which may be supplied as a liquid pulp, e. g. in aqueous suspension, and which is to be classified or separated into fractions having different characteristics of particle size or settling rate. In a more particular sense, the invention involves features of special novelty and utility in the hydraulic sizing of ores and other mineral substances, important examples of such material, for which the invention is peculiarly adapted and designed, being phosphate ores, in the form sometimes referred to as phosphatic sands. Apparatus for hydraulically sizing mineral phosphate material must be able to handle the solids in large quantities and in a continuous, rapid and efficient manner, for instance so as to classify the ore for subsequent concentration or like procedures or even for direct utility of the recovered product or products.

One effective mode of hydraulic classification has involved the use of a so-called teeter column, wherein a procedure sometimes defined as hindered settling is performed. Such operation involves an upwardly flowing column or current of liquid against which the particles of the supplied pulp are introduced and in which a constriction is placed, i. e. at the lower end, so that the velocity of the fluid across the constricted area is greater than that above. Whereas in so-called free settling of solid particles against rising water currents, the grains sink rapidly and continuously although to an extent differentially in accordance with particle size or specific gravity (the coarser or more dense particles of mineral sinking against currents of greater velocity), the effect of the constriction is that certain particles which would otherwise settle through the column against its selected velocity, fall to the constriction but cannot fall further.

That is to say, if the liquid flow is correlated with the particle size (and density) characteristics of the supplied solids so that the fastest-settling fraction of the latter would (normally) settle with rapidity against the velocity of liquid in the upper part of the column but not against a velocity as high as that at the constriction, the particles tend to remain in a mass in the tube above the constriction. Thus if the particles are not too large and the ratio of area of constricted portion to the tube cross-section is not too small, the mass of particles above the constriction will teeter, somewhat like a quick sand. Particles settling are therefore hindered by the solids in teeter; the liquid and solid mixture, for a considerable distance above the constriction, provides an effective fluid density greater than that of the liquid, e. g. water, itself. The result is, in effect, a decrease in settling rate of solid particles in the vessel, permitting a more efficient classification or fractionation of such particles in accordance with differences of settling rate. In practical use of such process, for example, a product of particles having a relatively high settling rate is removed from the foot of the column, e. g. material having a generally larger particle size than other parts of the feed, while fine material, by way of tailing, can be removed as overflow at the top of the column or of a series of such columns.

A common example of a hydrosizer of such type is a multiple-pocket Fahrenwald apparatus, embodying an array of teeter columns of the character described, arranged for separate removal of the larger particle size product from the foot of each column and providing passage of non-separated material from one column to the next, in order, at an upper region, while permitting overflow of the fines or tailing at the uppermost level of the machine. That is to say, the pulp of material to be sized is supplied at the head of the first of a series, for instance of five pockets, the arrangement thus permitting classifying operation on the supplied pulp, somewhat in succession from pocket to pocket.

As will be understood, the hindered settling process or maintenance of so-called teeter in each column, i. e. each pocket, is effectuated by continuous supply of fresh water, below the constriction at the foot of each, and in very considerable quantity so as to provide the desired conditions of generally upward and continuous liquid flow, including flow of locally greater velocity at the bottom. The removal of product from the foot of the pocket is achieved through a suitably controlled valve or other means, i. e. correlated with other factors so that pulp having or predominantly having a desired particle size range is discharged. For efficient operation of hydrosizers of this type, particularly in the case of relatively low cost minerals such as phosphatic ore the pulp feed at the head of the machine must have a relatively high solids content, e. g. of the order of 40% or often much more; at low pulp densities, the further dilution caused by the fresh water necessary to provide upward flow reduces the amount of solid material actually handled in each cell to an uneconomical value.

Although it is desirable, both for true hindered settling and for economy of water, to maintain a high density condition in a given column, this type of operation tends to reduce the yield of the desired coarse fraction in the column; much of the borderline size and some of the coarsest pass to the next pocket, only there recoverable by passing upward as much water as in the first. Operators indeed tend to use more water than necessary for true hindered settling in each pocket, to insure transfer of undesired particles to the next; even so, it is difficult to make a very sharp split in any single column, because some amount of the desired size material customarily overflows to the succeeding pocket or pockets.

While apparatus of the type just described has nevertheless found considerable utility, there remain a number of kinds or grades of material for which it is not sufficiently useful. For example, in the course of phosphate mining and recovery operations, there is often produced (e. g. after removal of certain valuable fractions) a body of solid particles which consist of mineral phosphate and silica or other useless material, having a variety of particle sizes ranging from, say, +20 mesh to −100 mesh, and wherein all but the relatively very coarsest fraction is useless. Thus in one such type of so-called phosphatic sand, having a particle size range as just described, it is commonly found that the material smaller than about 35 mesh is practically worthless, the valuable phosphate being very predominantly contained in the larger particles. In the normal operation of a hydrosizer such as described above, the material removed as product in pockets beyond the first or second, is partly or even predominantly in the particle size ranges smaller than 35 mesh, and indeed as small as 65 mesh or so. While the first two pockets can often be operated to cut off rather sharply at 35 mesh, i. e. keeping their products at +35, they do not alone provide a good recovery of that fraction of the feed; much of it continues to further pockets, to be discharged with finer material as stated above.

A further obstacle to the use of the described type of hydraulic sizing, i. e. hindered settling, for treatment of the material mentioned above is that the latter is ordinarily in a very dilute pulp. Such material, being for instance, tailings or the like from washing or other phosphate separation or classification steps (and being, in one plant, commonly identified as such tailings, or tabling plant middlings, from rock mined in a so-called "standard grade" area), is usually obtained as a suspension of low solids content, e. g. 20% or less. In order to meet the customary requirements for operation of a teeter column as explained above, such pulp first has to be dewatered or thickened. This preliminary operation in the sequence requires special apparatus and involves correspondingly continuing expense, to separate a large part of the water from the material; yet in the subsequent hydrosizing, i. e. if it were otherwise practical, a great quantity of fresh water must be introduced and ordinarily entails further expense for its supply.

An important object of the present invention is therefore to afford improved apparatus and procedure for hydraulic sizing or classification, designed for efficient treatment of material of the character described above, to yield a product in the relatively coarse particle size range.

Another important object is to provide for hydraulic sizing operation of novel and improved character, which embodies the practice of hindered settling and which is adapted to handle large quantities of material, yielding a product of relatively specific or narrow particle size range and yet with relatively higher recovery of material in such range, than heretofore efficiently possible by hindered settling operations. A still further object is to provide apparatus and procedure of the character described, adapted to handle a feed of highly dilute pulp and yet to afford efficient classification by size, especially with respect to particles of relatively coarse dimension.

Still further objects are to provide new and improved apparatus for hydraulic sizing, which is adapted to operate efficiently with feed of a dilution or other character heretofore not economically handled in such apparatus, and which is adapted to constitute, in a single, unitary structure, means for classifying solid material to an extent or in a manner heretofore achieved only by employment of a plurality of devices or stages. Another object is to afford hydraulic sizing apparatus providing in a single stage operation a separation produced by hindered settling and yet achieved with respect to extremely dilute feed without preliminary dewatering or thickening.

Other objects are to afford improved procedure and apparatus for hydraulic classification of phosphate material, particularly designed to separate from a dilute pulp of such material, having not more than about 20% solids, a product principally embodied in the particle size range above about 35 mesh while rejecting material, in substantial quantity, of smaller size.

To these and other ends, one important practical embodiment of the invention involves the provision of an upright column of liquid, to which the pulp to be classified is continuously supplied at the upper end, and which has at its top, provision for overflow of excess liquid and extremely fine material. The upper part of such column may constitute, in effect, a receiving and pre-settling tank, opening into the lower portion of the column, wherein so-called hindered settling is accomplished. A supplemental column is maintained at the upper part of the apparatus, for example by a vessel inverted within the tank portion, coextensive with a substantial part of the latter in a vertical direction. Such vessel opens downwardly toward the lower or teeter column portion of the arrangement and at its upper part communicates to a discharge locality through a conduit arranged, in cooperation with the inverted vessel, to provide siphon action for continuous flow of liquid, with solids suspended therein, upward through the vessel and thence to the discharge locality. The teeter column portion embodies provision for continuous introduction of fresh liquid, i. e. water through a constriction at its foot, together with means for continuous or other controlled discharge of a desired product of material having relatively high settling rate.

In operation, for example with a highly dilute pulp such as the "standard grade area" material mentioned hereinabove, all of the solids (except a small fraction consisting principally of extremely fine material) tend to settle through the upper or tank part of the column. The net effect of the inflow of liquid, both as pulp at the top and as fresh water at the foot, is to provide a continuous upward flow in the supplemental column, i. e., within the inverted vessel and under the influence of siphon action which constantly withdraws such liquid. To the extent that solids of the desired, large particle size, e. g. +35 mesh, may be carried into the supplemental column, they tend to settle and thus fall into the lower part of the complete arrangement, along with other quantities of such solids directly falling from other regions of the upper or tank section.

In the lower column, the effect of incoming fresh liquid through the constriction, and of the maintained density of suspended particles, affords the conditions of teeter, with consequent, selective settling of the coarser particles toward the foot of the column, where they are removed as a relatively dense or concentrated pulp. In considerable and usually major part the remaining solids are carried upwardly with respect to the teeter column and are swept into the upper or supplemental column by the siphon action described above. In consequence continuous removal of such fraction is achieved through the siphon discharge conduit, together with a considerable volume of water representing at least a substantial part of the water originally constituted in the feed pulp. The whole operation is entirely continuous, yielding a product essentially restricted to the coarser material as desired, and discharging, as tailing (or as feed for other operation), the finer fraction, carrying relatively little of the faster-settling solid substances from the originally dilute pulp.

By way of specific example and for further exposition of the features and principles of improvement, one embodiment of the invention is shown in the accompanying drawing, which represents, in somewhat simplified form, a vertical section of such apparatus, illustrating schematically the relative arrangement of the several elements.

Referring to the drawing, the apparatus comprises a generally upright vessel that has an upper, cylindrical tank portion 10 having a relatively large (horizontal) diameter and having a cone-shaped, i. e. frusto-conical bottom 12. The latter thus tapers to a lower opening 13, which is nevertheless of substantial width, at the top of a lower, column portion generally designated 14. Like the upper tank portion 10 the lower part 14 is conveniently cylindrical, i. e. about a vertical axis; it preferably comprises a narrow portion 15 and a lower part or discharge pocket 16 having a somewhat larger diameter, for example as shown.

The tank 10, conveniently open at its top, has top edges 18 over which liquid may continuously flow into a surrounding overflow launder 20. The launder 20 encircles the top of the tank, and has suitable means, e. g. as indicated by the conduit 22 for carrying away the liquid which overflows into it. At the foot of the lower or teeter column portion 15—16, a constriction plate or false bottom 24 is disposed, i. e. constituted by a perforated or foraminous sheet provided with small equally spaced openings which have a total area suitable for the restricted passage of a teeter column and which may each be sufficiently small to inhibit appreciable escape of solids reaching such locality. The constriction plate 24 permits continuous upward passage in a distributed or disperse form, and at the desired, locally accelerated rate, of fresh or supplemental water which is introduced through a conduit 26 into the relatively shallow water chamber 27 provided between the constriction plate and the true bottom 28 of the entire vessel.

An upper or supplemental column is provided by a cylindrical structure 30 above the column 15—16 and advantageously at a central position inside the tank portion 10. More specifically, the upper column 30 comprises an inverted, cylinder vessel coaxial with the tank and extending vertically through a substantial extent of the latter. The vessel 30 thus has its mouth 32 opening downwardly toward the entrance 13 of the lower column arrangement, the mouth 32 of the upper column being conveniently spaced above the opening 13 and also spaced laterally with respect to the surrounding lower wall of the tank, viz. the cone-shaped portion 12. Thus around the vessel 30 a region is provided for downward travel of the introduced solids to the locality between the mouth 32 of the upper column and the opening 13 of the lower column 15—16. At its otherwise closed top, the vessel 30 opens into a conduit 34 which extends laterally and downwardly, for example as shown, to a discharge end 35 outside the apparatus.

Siphon action is thus provided through the column 30 and the conduit 34 for continuous displacement of liquid along the latter, and out at the locality 35. A throttling valve 36 is shown in the conduit 34 at or near its lower end, to control the rate of flow through the conduit and thus the rate of flow upwardly in the internal or supplemental column. Alternatively or in addition, such rate of flow may be controlled by adjusting the position of the discharge end 35, i. e. as by raising or lowering it, the conduit 34 being then understood to be fashioned, at least in some part, of flexible material or otherwise constructed for such adjustment. While the conduit 34 may in some cases extend above the upper level 38 of liquid in the tank 10 before it turns downwardly to its lower terminus 35, and while in such case a suction pump or the like may be provided in the conduit to start the liquid flow, a preferred arrangement is to carry the conduit through the side wall of the tank at a lower position as shown. The siphon action is thus entirely automatic and self-starting.

Material to be sized or classified, in the form of an aqueous pulp of the divided solids, is continuously introduced into the open top of the tank 10, for example as diagrammatically indicated by the supply conduit 40 discharging such suspension.

Withdrawal of the separated product, viz. the substantially de-watered fraction containing at least predominant material of the desired larger size range, is obtained by appropriate means near the bottom of the teeter column 15, 16. While any instrumentalities suitable for removal of the larger particle size fraction from the foot of a hydrosizer pocket or the like may be employed and may include automatic controlling instrumentalities, the drawing, for simplicity, shows a conduit 42 opening through the false bottom 24 and the true bottom 28, and regulated at its mouth by a cone plug valve 44 adjustable up and down to close or open the aperture to a desired extent and thus to permit, when open, a continuous, gravity discharge of the concentrated pulp containing the larger particles settled from the column 15—16. It will be understood that for simplicity, the actuating and control devices (for example, of the usual electrical type) for the valve 44 are omitted from the drawing, the adjustable nature of this element being simply indicated by the arrows 45.

A hydrostatic pipe 47 extends downwardly into the lower column portion 15—16, conveniently through the pocket part 16, as shown, and opens at a locality 48 slightly above the false bottom 24 so that liquid may rise in the pipe 47 under the pressure existing at its lower opening 48. At its upper part 49, the vertically extending hydrostatic column may be made of transparent material, such as transparent plastic, for observation of the level of liquid therein. The top 50 of the pipe is open to the atmosphere and disposed at a height above the top edge 18 of the tank 10 such that the pressure of liquid in the pipe is never sufficient to force liquid out of the top of the column, under a wide range of normal conditions. The hydrostatic pipe 47, which involves no continuous flow and therefore contains essentially only water, affords an indication of the pulp pressure existing at its lower end. Thus during operation the water in the pipe rises to a level 51, above the level 38 of the tank 10, representative of the increased pressure at the bottom (over the head of water alone) due to the greater fluid density that is in turn occasioned by the suspended solid particles, especially in the column 14.

Assuming that the apparatus has been brought to a state of continuing operation as by filling the vessel 10—15—16 with water and gradually bringing the feed of pulp and supplemental water to desired, operating values, one example of the procedure is essentially as follows: Ore pulp, for example consisting of water containing approximately 20% solids or less, in suspension, is continuously introduced through the conduit 40, into the open top of the tank. At the same time, water required to activate the teeter column is continuously supplied through the conduit 26 at the bottom; it will now be understood that the quantity or rate of supply of such water is very considerably less than would be necessary were the same pulp feed to be handled in conventional apparatus of the hindered settling type. Indeed the amount of water introduced through the conduit 26 need only be a small fraction of what would be required to operate a hydrosizer of ordinary character if the latter were employed to attempt similar separation, e. g. with a de-watered feed having the same absolute quantity of solids.

As stated, the dilute pulp is continuously fed into the open top of the filled tank 10. Except for a relatively small quantity of predominantly very fine material, the solids settle and travel down through the annular space 52 between the lower end of the column 30 and the lower side wall 12 of the tank portion 10. On reaching the region 54 between the lower column opening 13 and the upper column opening 32 directly above it, the particles become exposed to conditons existing within the two columns. Relatively finer particles, as well as others of low specific gravity, are carried upward in the column 30 and discharged through the siphon conduit 34.

Coarser particles, together with others of greater specific gravity tend to settle in the lower column 15—16. The body of liquid in the lower column is thus traversed by the particles of faster settling rate, it being understood that, in accordance with the normal operation of hindered-settling, the column 15—16 contains in its teetering suspension, a number of the finer particles (the proportion of them decreasing toward the bottom), such particles being kept from settling not merely by the upward water flow but especially by the conditions of teeter and the increased fluid density due to the high total concentration of solids under the stated conditions, substantially throughout the height of the teeter column 15—16. Such maintenance of conditions in the column 15—16 at a suitable working equilibrium thus provides a continuous discharge of a thickened pulp (for example, having a solids content of 50% or more), containing the desired coarser or otherwise faster settling particles, through the conduit 42. It will be understood that the valve 44 was opened, to permit such discharge, as soon as the pulp density (represented by the pressure reading of the hydrostatic gauge 47) reached a value indicating sufficient accumulation of the stated product at and near the bottom of the column.

It is noteworthy that the system affords a better realization of hindered settling in the lower vessel 14 than is ordinarily achieved in a teeter column, yet with a great economy in the feed of water to such column; that is to say, because of the positive removal of the finer particles by the upper column, it is unnecessary to supply a great excess of water to the lower column to carry them off, and conditions of teeter and high pulp density can be maintained there to a very complete and effective degree.

Simply by way of diagrammatic illustration, the downwardly settling mass of particles in the upper part of the tank 10, containing substantially all sizes, is indicated at 60, the further position of such mass of particles between the columns is represented at 61, and the downwardly traveling, larger or more dense particles at 62 in the column part 15. While as explained above, the complete solid content at 62 may also include a considerable quantity of finer particles, the pulp at the lower part of the discharge pocket 16 is almost exclusively a suspension of the larger or faster-settling fractions as represented at 63. The upwardly discharging, finer particles at the head of the supplemental column 30 are represented at 64; there are relatively few particles, and even those present are for the most part settling downward against the rising liquid. The upward travel of water in the columns 15—16 and 30, as well as further travel in the siphon pipe 34, is indicated by dotted arrows.

The operation in the upper column 30 is understood to involve direct upward carriage of the finer particles by the constantly rising column of water, there being presumably no teeter action and the separation of larger particles at this region being by simple downward or free settling; indeed only a fraction of them rise to any great extent within the column 30. Both the column 30 and especially the space above the lower column opening 13 constitute a pre-settling zone for the larger particles. The size of the rejected particles, i. e. as withdrawn through the siphon 34, may be controlled by changing its rate of flow, viz. by adjusting the valve 36, or otherwise as indicated above.

With respect to the discharge at the foot of the column 15—16, the size of the particles there withdrawn depends upon the following more or less inter-related factors: (1) the density maintained in such column, (2) the rate of discharge of the settled particles, and (3) the volume of water introduced through the pipe 26. The density in the column 15—16 (generally designated 14) may be observed at the upper part 49 of the hydrostatic pipe 47, the discharge through the valve 44 being preferably regulated to occur only as and when the water level 51 remains at not less than a predetermined height. Other things being equal, the greater the density in the column 14, the higher the pressure at its foot, and at the same time, the less is the likelihood of smaller (or slower-settling) particles reaching the foot of the column. The settling action is governed by the rate of product discharge (through the outlet 42) in that such rate should be high enough to provide a desired yield, yet sufficiently low to prevent undue decrease of density in the column 14 and undesired contamination of the product with finer particle sizes.

The rate of introduction of water through the pipe 26 may also be adjusted to accommodate the other factors as well as the dilution and other characteristics of the pulp that reaches the opening 13 and that constitutes, so to speak, the actual feed to the teeter column. For example, the actual upward flow of water in the column (which is at least in part governed by the rate of water supply) should be sufficient under the conditions of solids feed and discharge to keep the zone or boundary of selective action at the desired, large particle size or particle size range. It will be appreciated that in normal operation of the apparatus shown, and with a pulp feed at 49 which is constant or which may vary in its volume or rate of flow (rather than in dilution), factors such as the water supply at the pipe 26 and to a considerable extent the opening of the siphon valve 36 are adjusted at the outset and then left in the selected setting; immediate and continuous control of the product is then obtained by regulation of the valve 44, chiefly in accordance with observation of the sight glass 49 of the hydrostatic gauge.

It will be understood that at all times during operation there must be sufficient water entering the entire column 10—12 with the feed, to keep the upper tank portion 10 full. Indeed the total rate of water introduction, i. e. counting both the pulp feed and the supply through the pipe 26, is preferably in excess of that required for the desired upward flow in the column 30 and for the relatively minor quantity of water withdrawn in the product delivery pipe 42; thus there is continuous overflow at the edges 18, into the launder 20. Some fine material, predominantly the finest fraction of the feed (having ordinarily no utility, in the case of phosphatic sands) passes along with the overflow.

While other configurations and relationships of elements may be employed in some cases, certain dimensional relations are believed to have special value in the apparatus. For instance, it appears important to have the annular area 52 at least as great as the area of the mouth 32 of the upper column. Indeed preferably the annular area 52 may be slightly larger, so that the liquid travel upward through the opening 32 tends to be faster than the downward travel through the opening 52. It will be understood that the procedure involves maintenance of the solids, through these regions and through the locality between the columns, in a state of continuous motion along or toward the described paths. The arrangement has essentially no storage capacity for solids; if solid particles tend to back up at the mouth of the upper column 30, the desired separating operation is impeded. Hence the stated dimensional relationships of the areas 32 and 52 tend to insure the desired continuity of flow and to prevent any backing-up.

It will also now be seen that the pulp in the upper column 30 should be sufficiently dilute, i. e. so that coarse particles may rapidly settle downward toward and into the teeter column 14, rather than become entrapped in the upwardly traveling, fine fraction. For instance, in phosphate ore feed of the character specifically described above, the liquid discharged through the siphon pipe 34 should have a solids content of not greater than about 20% by weight (it being understood that all solids concentrations herein are expressed in percentage by weight). While in some cases the diameter of the upper column 30 may be as small as or smaller than the lower column portion 15, the illustrated structure has afforded exceptionally good results in separation of the character described. While similarly, the lower or hindered-settling vessel 15—16, may have a constant diameter throughout its vertical extent, better results have been achieved with an enlarged portion 16 at the bottom, as shown. A greater yield of de-watered product appears to be obtained with such construction.

By way of specific example of operation, the following represent analyses of the desired coarse fraction product (through the discharge conduit 42), the reject or tailing discharged through the siphon 34, and the overflow material collected in the launder 20, for a representative run with a pulp feed of the character described above, viz. phosphatic sand (from the so-called "standard grade area") constituting about 20% of the supplied pulp (the balance being water) and having a variety of particle sizes from +20 mesh to —100 mesh. Specifically, the feed contained a little over 10% of +20 mesh material, but not more than about 6% of —100 mesh; something over 75% was larger than 65 mesh, while the fraction sought to be recovered, i. e. the total +35 mesh, was nearly 35% of the solids. In the analyses reported below, the grade of various fractions or materials was measured as percent B. P. L. (bone phosphate of lime), in accordance with standard practice of phosphate mining and recovery operations.

In the feed, the grade of particles smaller than about 35 mesh was relatively very low, i. e. averaging well under 20% B. P. L., so that such fraction was comparatively worthless.

The apparatus was essential as shown in the drawing, including a tank 10 having a diameter of 13" (inches), vertical cylindrical height of 12" and cone bottom 12 tapering at 45° to a column portion 15 of 3" inside diameter, 9" high, which in turn opened into a pocket 16 of 6" inside diameter and 6" height above a one inch-deep water chamber 27. The upper column 30 had an inside diameter of 6" and height of 12", being disposed so that the distance 52 was about 1¾", and having a siphon pipe 34 of one inch inside diameter. The feed was at a rate of about 50 lbs. of solids (dry weight) per minute; about 2½ gallons per minute of water were introduced through the pipe 26.

The following Tables I, II and III therefore respectively represent the analyses mentioned above, viz. on the product, tailings and overflow, showing the particle size and grade characteristics of these fractions:

*Table I.—Product, from foot of sizing column*

[71.3% solids, amounting to 17.1 lbs. per minute, dry weight; analyzed as dry.]

| Mesh | Percent Between Sieves | Cumulative Amounts (Total percent on each sieve) | B. P. L. (Percent) Between Sieves | Cumulative B. P. L. (Percent) |
|---|---|---|---|---|
| 20 | 34.0 | 34.0 | 65.40 | 65.40 |
| 28 | 24.9 | 58.9 | 49.72 | 58.77 |
| 35 | 27.0 | 85.9 | 29.54 | 49.58 |
| 48 | 10.4 | 96.3 | 23.90 | 46.82 |
| 65 | 3.0 | 99.3 | 18.60 | 45.96 |
| 100 | 0.7 | | | |
| Pan | Trace | 100 | 15.79 | 45.75 |

*Table II.—Tailing—siphon discharge*

[19.8% solids, amounting to 18.3 lbs. per minute, dry weight; analyzed as dry.]

| Mesh | Percent Between Sieves | Cumulative Amounts (Total percent on each sieve) | B. P. L. (Percent) Between Sieves | Cumulative B. P. L. (Percent) |
|---|---|---|---|---|
| 20 | Trace | Trace | | |
| 28 | 0.8 | 0.8 | | |
| 35 | 9.0 | 9.8 | 50.51 | 50.51 |
| 48 | 32.2 | 42.0 | 11.61 | 14.79 |
| 65 | 32.2 | 74.2 | 8.01 | 9.59 |
| 100 | 17.7 | 91.9 | 6.65 | 8.31 |
| Pan | 8.1 | 100 | 6.43 | 7.95 |
|  |  |  | 8.46 | 7.99 |

*Table III.—Tank overflow, at top*

[4.8% solids, amounting to 13.8 lbs. per minute, dry weight; analyzed as dry.]

| Mesh | Percent Between Sieves | Cumulative Amounts (Total percent on each sieve) | B. P. L. (Percent) Between Sieves | Cumulative B. P. L. (Percent) |
|---|---|---|---|---|
| 20 | Trace | Trace | | |
| 28 | 1.0 | 1.0 | 49.16 | 49.16 |
| 35 | 3.2 | 4.2 | 19.62 | 26.65 |
| 48 | 12.1 | 16.3 | 9.02 | 13.56 |
| 65 | 45.1 | 61.4 | 4.96 | 7.24 |
| 100 | 27.5 | 88.9 | 5.52 | 6.71 |
| Pan | 11.1 | 100 | 7.55 | 6.80 |

It will be observed that the withdrawn product was very sharply classified in particle size, being more than 85% +35 mesh and having practically no content below 65 mesh, while the siphon tailing constituted not more than about 10% +35 mesh, the remainder being distributed through the particle size range into −100 mesh fineness. At the same time, the grade of the recovered product averaged 45% B. P. L. or better, while the grade of the siphon tailings was less than 10% B. P. L. The overflow solids, which were smaller in total amount than either of the other fractions, represented material of even finer size and lower grade than the siphon tailings. To the extent, moreover, that a further phosphate concentration step, as by flotation or the like, is to be performed on the product, the high solids content of the latter (about 71%) made it eminently suitable for such subsequent procedure.

It may also be noted that with this specific type of feed to the apparatus shown, the operation involved a further feature of advantage, namely in respect to the material classed as +48 to −35 mesh. Such material in the product had a grade of about 24% B. P. L., yet in the tailings not better than about 8%—thus indicating that at the border line of particle size separation, the high specific gravity of the higher grade particles tended to bring them into the product rather than in the tailings.

It will now be seen that the apparatus and procedure afford novel and peculiarly efficient operations for classifying materials of the general character described, particularly for recovering a useful fraction, of acceptable grade and conveniently large particle size, under circumstances where hydraulic or other separating operations would not be economical and thus where the feed material would otherwise have been entirely discarded. There is no necessity to thicken or de-water the feed; on the contrary the arrangement is self-de-watering with respect to the ultimate product and involves an effective separation of the teeter type, made possible by the continuous withdrawal of large quantities of water along with the rejected, fine solids in the upper column and siphon discharge.

Other uses of the described improvements will also now be apparent. Indeed a plurality of machines such as illustrated may for certain purposes be arranged in tandem, for example by using the siphon discharge of the first as feed to a second apparatus operated to separate a product of finer particle size than the first, i. e. representing the larger particle size fraction of the first siphon discharge. Or if for some reason it is inexpedient in one complete column or cell to remove more than a part of a desired coarse particle size fraction, the tailings (from the siphon) may be fed to another and similarly operated cell for removal of a further part of such fraction. Nevertheless, the invention is of outstanding advantage for the operations which may be completed, so to speak, in a single cell, such advantage being demonstrated by the example given above wherein useful phosphate was recovered by this single, simple process, from a material that for economic reasons would otherwise have been discarded.

It is to be understood that the invention is not limited to the specific structures and steps herein set forth, but may be carried out in other ways without departure from its spirit.

I claim:

1. Hydraulic sizing apparatus comprising, in combination, a tank for receiving pulp to be sized, teeter column means below said tank and opening into the bottom thereof, for removing solids of high settling rate from said pulp, siphon means opening into said tank above said teeter column means for removing solids of low settling rate from the pulp, said tank extending upwardly from the vicinity of the siphon means opening and being adapted to receive a continuous supply of said pulp above said siphon means opening and said tank being shaped to direct a continuous flow of the received pulp in and downwardly through the tank into a space between the opening of the siphon means and the opening of the teeter column means at the bottom of the tank, said teeter column means and said siphon means respectively comprising vertically extending vessels, the vessel of the siphon means having a cross-section at least about as large as the cross-section of the vessel of the teeter column means, said teeter column means opening upwardly to said space and having means at a lower part of its said vessel for introducing liquid to provide hindered settling in and above said lower part of its said vessel and means separate from the last-mentioned means at said lower part of the teeter column vessel for removing pulp of high settling rate solids therefrom, said siphon means opening downwardly to said space, the vessel of the siphon means being closed at its top and the siphon means also including a siphon tube communicating with the siphon means vessel at an upper portion thereof and extending to discharge at a lower locality for effectuating upward flow of liquid in the siphon means vessel.

2. Hydraulic sizing apparatus for divided solid material, comprising means including an upright vessel for establishing and operating a teeter column of solid-containing liquid, extending upwardly from a lower part of said vessel, to remove solids of high settling rate from pulp supplied thereto, said teeter column means including means for supply of fresh liquid and means for removal of said solids of high settling rate, said liquid supply means and said solids removal means opening separately into said lower part of said vessel, a tank into the bottom of which said upright vessel opens at its top, said tank having liquid overflow means, a downwardly open vessel extending downwardly into the tank in spaced relation to the walls of the tank and having a downward opening spaced above the aforesaid top opening of the first-mentioned vessel, said tank continuously directing flow of solids-containing liquid downwardly around the periphery of the said downward opening of the second vessel and into the space between the vessels, and said second vessel having a horizontal cross-section at least about as large as the horizontal cross-section of the first vessel, and discharge conduit means extending from an upper part of said second-mentioned vessel to a lower locality and providing therewith a siphon for continuous removal of solids of low settling rate, said tank having means for supplying it with feed pulp continuously at a locality above the aforesaid space and outside the said second vessel, to effect the aforesaid flow of liquid to the space between the vessels, for supply of solids to said teeter column means and for removal of solids by said siphon.

3. Hydraulic sizing apparatus for divided solid material, comprising, in combination, a vessel having a lower column portion and an upper tank portion communicating therewith, said upper tank portion having an upper edge for overflow of liquid, and said upper tank portion receiving a pulp to be sized, means for introducing fresh liquid into the bottom of said lower column portion for effecting hindered settling action of pulp therein, means for removal of liquid which contains solid material of high settling rate from the lower part of said column portion, said liquid-introducing means including constriction means through which the liquid is introduced, opening into the lower column portion separately from said liquid removal means, an inner column disposed in said upper tank portion and opening downwardly above the lower column portion, said inner column, at its said opening, being spaced from the walls of said tank portion by an area at least about as great as the area of said opening, and conduit means extending from an upper part of said inner column and constituting therewith a siphon for removing liquid which contains solid material of low settling rate, said upper tank portion comprising means continuously directing received solids-containing liquid downwardly past the periphery of the aforesaid downward opening of the inner column, and into a region between the lower column portion and the said inner column, and said inner column having a cross-section at least about as large as the cross-section of the lower column portion.

4. Hydraulic sizing apparatus for divided solid material, comprising hindered settling column means having an upper solids-receiving opening, for effecting selective settling of high settling rate solids, tank means above and opening to said column means for continuously receiving liquid pulp of solid material to be treated, and means extending into said tank means below the liquid therein and having, at its lower end in said tank, a downwardly facing opening in vertically spaced relation over said column means opening, for drawing liquid upward and out of the tank means, to remove low settling rate solids, said solids-removing means comprising an upright inverted vessel disposed within the tank means and providing said downwardly facing opening at its lower end, and means connected with an upper part of said inverted vessel for drawing liquid continuously therefrom to produce continuous upward flow of liquid and solids in said inverted vessel, said inverted vessel being constructed and arranged to afford substantially only vertical, upward flow therein and to provide free settling conditions in said vessel for settling of high settling rate solids to said space while low settling rate solids are carried away by said flow, said tank means comprising structure continuously directing solids-containing liquid, which fills the tank means, downwardly to said space between the opening of the inverted vessel and the opening of the hindered settling column means, and said hindered settling column means comprising an upright, vertically elongated vessel having liquid-introducing means at its lower part, for effecting teeter of suspended solids at and upwardly from said lower part, and means opening into said lower part of said vessel separately from said liquid-introducing means, for withdrawing pulp of high settling rate solids.

5. Hydraulic sizing apparatus comprising an upright vessel having upwardly opening column means at its lower part for selectively settling solids of high settling rate, said column means including liquid-supplying means for maintaining hindered settling therein, said liquid-supplying means opening into the lower end region of the column means, and said column means having means opening into said lower end region thereof separately from the liquid-supplying means, for removing accumulating solids of high settling rate, said vessel having an upper part and means opening downwardly in said upper part of the vessel at a locality spaced above the column means, for advancing liquid from the vessel to remove solids of low settling rate, said downwardly-opening means comprising inverted column means having a width at least about as great as the width of the lower column means and having substantially vertical walls, and means communicating with an upper part of said inverted column means to draw liquid upwardly therein and away, with low settling rate solids, to a discharge locality, said inverted column means being constructed and arranged to provide free settling therein of high settling rate solids against the upward flowing liquid therein, said vessel extending upward around the inverted column means to hold liquid to a level remotely above the aforesaid downward opening of the inverted column means, said vessel opening, around the inverted column means, into the space between the aforesaid upward and downward openings, said vessel having associated means for introducing continuous feed of solids-containing liquid into the vessel at a locality remotely above the downward opening of the inverted column means, and said vessel being shaped and arranged for continuous downward flow of the liquid therein outside of the inverted column means, to direct solids-containing liquid downwardly to the space between the aforesaid upward and downward openings for impeding hindered settling above the lower column means while supplying solids to both said inverted and lower column means.

6. Hydraulic sizing apparatus comprising, in combination, a vessel having an upper tank portion, a lower column portion, and an intermediate conical portion connecting the first-named portions, means comprising a vessel closed at its upper end and disposed within the tank portion and opening downwardly at the region of said conical portion in spaced relation above said lower portion, for drawing liquid continuously upward from the region of said conical portion, said means including a discharge conduit communicating with the upper end of the second vessel and carrying said liquid to a locality outside the first-mentioned vessel, said second vessel having a horizontal cross-section at least about as large as the horizontal cross-section of the lower column portion, means at the lower end of said lower portion for introducing liquid to provide upward flow in the lower portion for effectuation of hindered settling there in and upwardly from said lower end, discharge means opening at the lower end of said lower portion separately from the liquid-introducing means, for removal of pulp including solid material settling thereto, and means for continuously introducing into the top of the first-mentioned vessel, a pulp containing divided solid material, said first-mentioned vessel being adapted to be thereby maintained filled with liquid, said first-mentioned vessel conducting said pulp in continuous flow downwardly into the conical section and continuously past the periphery of the opening of the second vessel into the space above the lower column portion, said means which opens downwardly into the conical portion being adapted to remove liquid carrying particles of lower settling rate while permitting free settling of faster settling particles, and said lower column portion, by its aforesaid hindered settling, providing selective downward settling of particles of faster settling rate, for removal through the aforesaid discharge means.

7. Hydraulic sizing apparatus for divided solid material, comprising, in combination, a vessel adapted to contain liquid and to receive said solid material for separation in accordance with particle size characteristics, said vessel comprising a vertical tank at its upper part, a vertical column opening upwardly below said tank and having a substantially smaller diameter than the tank, and a wall connecting said tank with said column for direct communication, said wall extending inwardly to the wall of the column, a second column structure disposed within the tank and coaxially above the first-mentioned column, said second column opening downwardly at a locality spaced above the opening of the first column and said second column being closed at its upper end and having a conduit extending therefrom and constituting therewith a siphon for removal of liquid from the tank, means including constriction means and liquid supply means, for producing upward flow of liquid from the foot of said first column to effectuate hindered settling in said first-mentioned column with respect to suspended solid material reaching the opening of said first column, and means opening into the foot region of said first column separately from the said liquid supply means, for withdrawing settled solids from said first column, said second column having a diameter at least as large as the diameter of the first vertical column, said tank constituting structure for receiving dilute liquid feed pulp to fill the tank and for directing said dilute pulp downwardly in the tank along the outside of the second column and into the region between the vessels, and said siphon conduit and said second column being constructed and arranged to draw liquid upward in said second column in only a substantially vertical direction therein, for removing liquid-containing solids of small particle size while permitting free settling therein of solids of larger particle size.

8. Apparatus as described in claim 7, wherein the second column is disposed and dimensioned relative to said vessel so that it is transversely separated from the inside surface of the vessel by an area which is at least as great as the area of the downward opening of said second column, said siphon conduit having a throttling valve for adjusting the rate of flow of liquid in said second column, to vary the particle size characteristics of the solids removed by the siphon.

9. Apparatus as described in claim 7, wherein the aforesaid connecting wall tapers conically from the tank to the first column, and wherein the second column is disposed so that its downwardly open end is within the tapering connecting wall region of the vessel, the spacing of said second column, at its opening, from the said tapering wall constituting a greater area than the area of said downward opening of the second column.

10. Hydraulic sizing apparatus for divided solid material, comprising, in combination, a vessel adapted to contain liquid and to receive said solid material for separation in accordance with particle size characteristics, said vessel comprising a vertical tank at its upper part, a vertical column opening upwardly below said tank and having a substantially smaller diameter than the tank, and a wall connecting said tank with said column for direct communication, said wall extending inwardly to the wall of the column, a second column structure disposed within the tank and coaxially above the first-mentioned column, said second column opening downwardly at a locality spaced above the opening of the first column and said second column being closed at its upper end and having a conduit extending therefrom and constituting therewith a siphon for removal of liquid from the tank, means including constriction means and liquid supply means, for producing upward flow of liquid from the foot of said first column to effectuate hindered settling in said first-mentioned column with respect to suspended solid material reaching the opening of said first column, and means for withdrawing settled solids from said first column, said second column having a diameter at least as large as the diameter of the first vertical column, said tank constituting structure for receiving dilute liquid feed pulp to fill the tank and for directing said dilute pulp downwardly in the tank along the outside of the second column and into the region between the vessels, and said siphon conduit and said second column being constructed and arranged to draw liquid upward in said second column in only a substantially vertical direction therein, for removing liquid-containing solids of small particle size while permitting free settling therein of solids of larger particle size, said first-mentioned column including a portion of enlarged horizontal diameter at its lower part, a perforate member disposed across said enlarged region in spaced relation to the bottom thereof to constitute said constriction means and to provide a liquid chamber below said member, and said liquid supply means being arranged in communication with said liquid chamber so that the liquid supplied to the lower column is introduced through and locally accelerated at said member.

References Cited in the file of this patent

UNITED STATES PATENTS

| 625,508 | Hyatt | May 23, 1899 |
| 1,490,420 | Elder | Apr. 15, 1924 |
| 1,729,545 | Marchant | Sept. 24, 1924 |
| 1,959,212 | Miller | May 15, 1934 |
| 2,105,126 | Pellett | Jan. 11, 1938 |
| 2,230,782 | Maust | Feb. 4, 1941 |
| 2,360,129 | Hebbard | Oct. 10, 1944 |
| 2,418,821 | Coghill | Apr. 15, 1947 |
| 2,425,551 | McKay | Aug. 12, 1947 |
| 2,442,522 | Wiegand | June 1, 1948 |

FOREIGN PATENTS

| 29,617 of 1912 | Great Britain | May 15, 1943 |

OTHER REFERENCES

U. S. Bureau of Mines Report: R. I. 3851, January 1946, Continuous Hydraulic Classification.